US007644350B2

(12) United States Patent
Piersol (10) Patent No.: US 7,644,350 B2
(45) Date of Patent: Jan. 5, 2010

(54) TECHNIQUES FOR VALIDATING MULTIMEDIA FORMS

(75) Inventor: Kurt Piersol, Campbell, CA (US)

(73) Assignee: Ricoh Company, Ltd. (JP)

( * ) Notice: Subject to any disclaimer, the term of this patent is extended or adjusted under 35 U.S.C. 154(b) by 264 days.

(21) Appl. No.: 11/060,888

(22) Filed: Feb. 18, 2005

(65) Prior Publication Data

US 2006/0190810 A1 Aug. 24, 2006

(51) Int. Cl.
*G06F 17/00* (2006.01)
(52) U.S. Cl. .................. 715/221; 715/224; 715/225; 715/226
(58) Field of Classification Search ......... 715/505–507, 715/508, 221–226
See application file for complete search history.

(56) References Cited

U.S. PATENT DOCUMENTS

| | | | | |
|---|---|---|---|---|
| 5,008,810 | A * | 4/1991 | Kessel et al. ............... | 715/506 |
| 6,081,264 | A * | 6/2000 | Rosen et al. ............... | 715/723 |
| 6,950,981 | B2 * | 9/2005 | Duffy et al. ................ | 715/222 |
| 7,103,835 | B1 * | 9/2006 | Yankovich et al. .......... | 715/505 |
| 7,188,127 | B2 * | 3/2007 | Stakutis et al. ............. | 707/204 |
| 2001/0054046 | A1 * | 12/2001 | Mikhailov et al. .......... | 707/500 |
| 2003/0158893 | A1 * | 8/2003 | Komatsu et al. ............ | 709/203 |
| 2003/0194148 | A1 * | 10/2003 | Haeberli .................... | 382/283 |
| 2004/0205525 | A1 * | 10/2004 | Murren et al. .............. | 715/505 |
| 2004/0225681 | A1 * | 11/2004 | Chaney et al. ............. | 707/104.1 |
| 2005/0108624 | A1 * | 5/2005 | Carrier ...................... | 715/505 |
| 2005/0108625 | A1 * | 5/2005 | Bhogal et al. .............. | 715/505 |
| 2005/0123150 | A1 * | 6/2005 | Betts ......................... | 381/94.3 |
| 2005/0235201 | A1 * | 10/2005 | Brown et al. ............... | 715/517 |
| 2006/0288262 | A1 * | 12/2006 | Toji .......................... | 714/699 |

FOREIGN PATENT DOCUMENTS

WO  WO 00/02149  1/2000
WO  WO 2004/003768 A1  1/2004

OTHER PUBLICATIONS

Maret, et al., "Multimedia Information Interchange: Web Forms Meet Data Servers," Jun. 7, 1999, Proceedings of the International Conference on Multimedia Computing and Systems, Los Alamitos, CA US pp. 499-505, XP000964627.
Web pages from http://www.kodakgallery.com/Welcome.jsp, 6 pages, (printed on Jun. 19, 2006).
Web pages from http://www.shutterfly.com/, 7 pages (printed on Jun. 19, 2006).

* cited by examiner

*Primary Examiner*—Thu Huynh
(74) *Attorney, Agent, or Firm*—Townsend and Townsend and Crew LLP (57) ABSTRACT

Techniques for creating and processing electronic forms that include at least one field that is configured to accept multimedia information as input. Techniques are provided for creating an electronic form comprising at least one field that is configured to accept multimedia information. Techniques are provided for specifying and associating a set of constraints (or predicates) with fields of a multimedia form, including specifying and associating one or more constraints with fields configured to accept multimedia information. Techniques for validating the electronic form based upon the constraints, if any, associated with the fields of the form. Various actions may be performed depending upon the results of the validation.

33 Claims, 7 Drawing Sheets

TRAFFIC ACCIDENT AND INSURANCE REPORT

ACCIDENT DETAILS

ACCIDENT DATE: ______ 102   ACCIDENT TIME: ______ 104

ACCIDENT LOCATION: ______ 106

DESCRIPTION (TEXT): ______ 108

AUDIO DESCRIPTION: ______ 110   VIDEO DESCRIPTION: ______ 112

PHOTOS: ______ 114

DRIVER DETAILS

NAME: ______ 120

DRIVER LICENSE #: ______ 122   DOB: ______ 124

ADDRESS: ______ 126

DRIVER PHOTO: ______ 128   INTERVIEW: ______ 130

ADJUSTOR NAME: ______ 132
Submit ~138   SIGNATURE: ______ 134
Cancel ~140   DATE: ______ 136

TECHNIQUES FOR VALIDATING MULTIMEDIA FORMS

BACKGROUND OF THE INVENTION

The present application relates to processing of forms, and more particularly to techniques for processing electronic forms having at least one field that is configured to accept multimedia information as input.

Forms are a common aspect of business and civic life. People fill out forms for a wide array of purposes. With the widespread use of computers, an increasing number of forms are now provided in electronic form and filled in using a computer. An electronic form may comprise a list of fields, each field configured to accept information of a particular type or value. Indeed, a rich array of software is presently available for constructing electronic forms. Such software allows a form creator to specify the list of fields to be included in a form. The form creator may also specify the type of information and/or a range of allowed values accepted by the form fields. For example, for a name field configured to accept information identifying the name of a person, the form creator may specify that the information input in the name field must be text information. As another example, for an age field configured to accept information identifying the age of a person, the form creator may specify that the information input in the age field must be of numeric type.

Various applications are also presently available for validating or checking electronic forms. Validation involves checking if the requisite information has been entered in the electronic form, checking the type of information entered in the fields of the electronic form, checking value ranges of the entered information, or even testing that a value entered in a field is unique within a certain database. A form is generally considered validated when all the requirements and conditions associated with the form or fields of the form are satisfied.

In most conventional forms, the fields are generally configured to accept text, numeric, or date information and validation is performed on these types of information. However, electronic forms in the future are likely to include fields that are configured to accept other types of information besides text, numeric, or date information. For example, electronic forms may comprise fields that are configured to accept as input multimedia information such as audio information, video information, or image format data. Techniques are desired for facilitating creation and validation of such multimedia forms.

BRIEF SUMMARY OF THE INVENTION

Embodiments of the present invention provide techniques for creating and processing electronic forms that include at least one field that is configured to accept multimedia information as input. Techniques are provided for creating an electronic form comprising at least one field that is configured to accept multimedia information. Techniques are provided for specifying and associating a set of constraints (or predicates) with fields of a multimedia form, including specifying and associating one or more constraints with fields configured to accept multimedia information. Techniques are provided for validating the electronic form based upon the constraints, if any, associated with the fields of the form. Various actions may be performed depending upon the results of the validation.

According to an embodiment of the present invention, techniques are provided for facilitating creation of an electronic form that comprises a first field that is configured to accept multimedia information as input, wherein the multimedia information comprises at least one of an image, audio information, or video information. Information is received identifying a set of constraints to be associated with the first field, wherein the set of constraints is used to validate information entered in the first field. The set of constraints is associated with the first field.

According to an embodiment of the present invention, information is received for combining constraints in a set of constraints associated with a first field of a form. Information may be received identifying one or more actions to be performed when the information entered in the first field is successfully validated based upon the set of constraints. Information may be received identifying one or more actions to be performed when the information entered in the first field is not successfully validated based upon the set of constraints.

According to an embodiment of the present invention, techniques are provided for creating an electronic form. An electronic form is created using a computer system, the electronic form comprising a first field that is configured to accept multimedia information as input, wherein the multimedia information comprises at least one of an image, audio information, or video information. A set of constraints to be associated with the first field and to be used for validating information entered in the first field is specified. One or more relationships for combining the constraints in the set of constraints to be associated with the first field may also be specified. One or more actions to be performed when the information entered in the first field is successfully validated or nor successfully validated may be specified.

According to an embodiment of the present invention, techniques are provided for validating an electronic form comprising a set of one or more fields. Input information entered in a first field from the set of fields is determined, wherein the input information comprises at least one of an image, audio information, or video information. A set of one or more constraints associated with the first field is determined. For each constraint from the set of constraints, a determination is made if the input information entered in the first field satisfies the constraint.

According to an embodiment of the present invention, a determination is made if a combination of the constraints in the set of constraints determined for the first field is satisfied by the input information entered in the first field.

According to an embodiment of the present invention, the first field is marked as acceptable if the combination of the constraints in the set of constraints is satisfied by the information entered in the first field, and marked as unacceptable if the combination of the constraints in the set of constraints is not satisfied by the input information entered in the first field.

According to an embodiment of the present invention, the first field is indicated as successfully validated if the input information entered in the first field satisfies each constraint in the set of constraints.

According to an embodiment of the present invention, techniques are provided for validating an electronic form comprising a set of fields. For each field in the set fields, input information entered in the field is determined, wherein the input information entered in at least one field from the set of fields comprises at least one of image information, audio information, or video information. For each field in the set of fields, a set of one or more constraints associated with the field is determined. For each field in the set of fields, a determination is made if the input information entered in the field satisfies the set of constraints associated with the field.

According to an embodiment of the present invention, the electronic form is indicated as successfully validated if, for each field in the set of fields, the input information entered in the field satisfies the set of constraints determined for the field, and indicated as not successfully validated if, for at least one field in the set of fields, the input information entered in the at least one field does not satisfy the set of constraints determined for the at least one field.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for creating and processing electronic forms that include at least one field that is configured to accept multimedia information as input. Techniques are provided for creating an electronic form comprising at least one field that is configured to accept multimedia information. Techniques are provided for specifying and associating a set of constraints (or predicates) with fields of a multimedia form, including specifying and associating one or more constraints with fields configured to accept multimedia information. The electronic form is then validated based upon the constraints, if any, associated with the fields of the form. Various actions may be performed depending upon the results of the validation.

An electronic form is intended to refer to an electronic entity (e.g., an electronic document) comprising one or more fields (or elements), each field configured to accept information. A field of an electronic form may be configured to accept input of a particular type. The type of information for a field generally depends on the context and nature of the information expected to be entered in the field. For example, a field for receiving age information may be configured to receive numeric information as input, a field for receiving address information may be configured to receive text information as input, and the like.

A multimedia form refers to an electronic form comprising at least one field that is configured to accept multimedia information (or a multimedia object) as input. A multimedia form may comprise a mix of fields configured to accept multimedia information and fields that are configured to accept text, date, numeric information, or other information as input. Multimedia information refers to any one of or a combination of video information (including animation information), audio information, images information (e.g., photo images, slides, whiteboard images), and other like types of information. There are many other forms of media which can be included under multimedia information, for example, time based sensor samples such as telemetry data, seismic data, other types of sensor measurement. Examples of multimedia information or objects include a video recording of a television broadcast (that may comprise audio, video, and possibly close-captioned (CC) text information), an audio clip such as a song, a digital photograph, a scanned image, etc. The multimedia information may be present in various formats including various MPEG formats (e.g., MPEG 1, MPEG 2, MPEG 3, MPEG 4, MPEG 7, etc.), MP3 format, Synchronized Multimedia Integration Language (SMIL) format, HTML+TIME format, WMF (Windows Media Format), RM (Real Media) format, Quicktime format, Shockwave format, various image formats (e.g., JPEG, etc.), various streaming media formats, formats being developed by the engineering community, proprietary and customized formats, and others.

Figure 1:
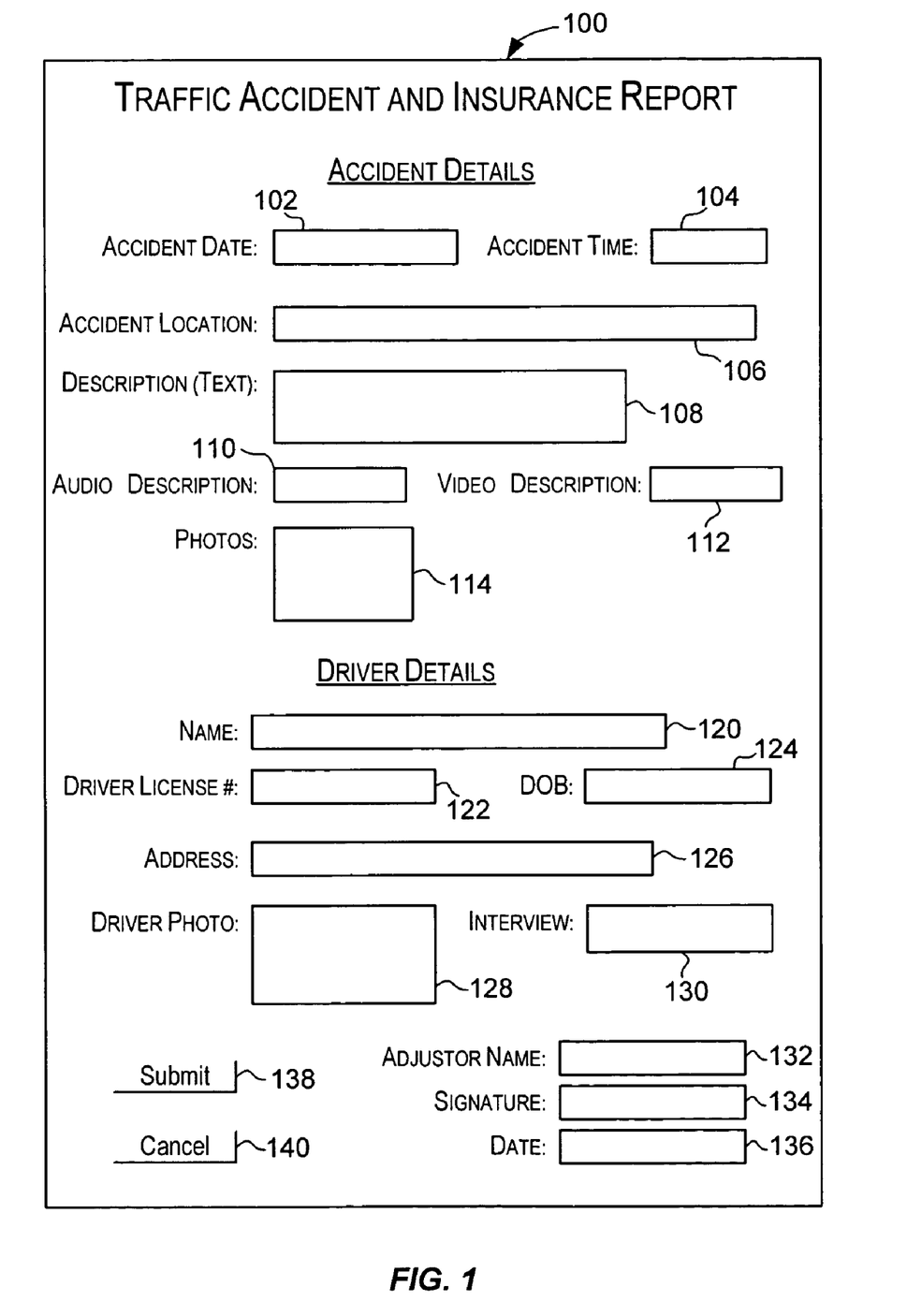
FIG. 1 depicts a simplified electronic multimedia form according to an embodiment of the present invention.

FIG. 1 depicts a simplified electronic multimedia form 100 according to an embodiment of the present invention. Form 100 is used for submitting a "Traffic Accident and Insurance Report". This form may be filled out by an insurance adjuster to report an accident. Form 100 comprises an "Accident Details" section for entering information about the accident and a "Driver Information" section for entering information about the driver involved in the accident.

The "Accident Details" section comprises several fields for entering information related to the accident. These fields include a field 102 for receiving information indicating the date when the accident occurred, a field 104 for receiving information specifying the time of the accident, a field 106 for receiving information identifying the location of the accident, a field 108 for receiving textual information describing the accident, a field 110 for receiving audio information (or an audio object) describing the accident, a field 112 for receiving video information (or a video object) of the scene of the accident, and a field 114 for receiving images or photos of the car(s) involved in the accident. Fields 110, 112, and 114 are fields that are configured to receive multimedia information as input. For example, an insurance adjuster may orally dictate a description of the accident scene using a voice recorder and the recorded audio object may then be input in field 110. The adjuster may use a video recording device such as a video recorder to record the accident scene and the video recording may be input in field 112. The adjuster may also take photos using a camera and the digitized photos may be input in field 114. Fields 102, 104, 106, and 108 are fields that are configured to receive text information, numeric information, or date information as input.

The "Driver Information" section of electronic multimedia form 100 comprises several fields for entering information related to the driver involved in the accident. These fields include a field 120 for receiving information identifying the name of the driver, a field 122 for receiving information identifying the license number of the driver, a field 124 for receiving information identifying the date of birth of the driver, a field 126 for receiving information specifying the address of the driver, a field 128 for receiving a photo of the driver, and a field 130 for receiving an interview of the driver conducted by the insurance adjuster. Fields 128 and 130 are accordingly fields that are configured to receive multimedia information as input. Field 130 may be configured to receive various types of multimedia information including audio information and video information. Fields 120, 122, 124, and 128 are fields that are configured to receive text information, numeric information, or date information as input.

Form 100 also provides a field 132 where the insurance adjuster can digitally sign the form after it has been filled. A field 134 for receiving information identifying the insurance adjuster and a field 136 for receiving information identifying the date when the insurance adjuster filled the form are also provided.

After the insurance adjuster has filled the form, he/she may select "Submit" button 138 to submit the electronic form for processing. Before the electronic form is submitted for processing, the form may be validated. As part of the validation, checks may be performed to determine if all the requisite information has been entered in the form, to determine if the information entered in the fields of the electronic form satisfies constraints, if any, associated with the fields of the form. For example, for field 114, validation may be performed to determine is the photo entered on field 114 by the adjuster satisfies the constraints, if any, associated with field 114. One or more actions may be performed depending upon the results of the validation. The actions to be performed may be configured for the form, for a field in the form, or even for specific constraints. For example, if the information entered in a particular field fails to satisfy the constraints associated with the field, then a message may be output to the form filler to re-input information for that field or to check or confirm the information input in that field. A reason for the validation failure may also be output. If the form is successfully validated, then the validated form may be forwarded to other systems or applications for further processing. Information indicating that the form has been validated may be stored along with the electronic form itself.

Validation may be performed interactively as the form fields are being filled. In the interactive mode, some kind of validation may be executed immediately upon filling of a field and the result of the validation may be output to the form filler, thereby allowing the form filler to receive immediate feedback on error conditions. Validation may also be performed on a batch basis when groups of fields or all fields have been filled. For example, as described above, validation may be performed on fields of a form when a user selects the "Submit" button.

Figure 2:
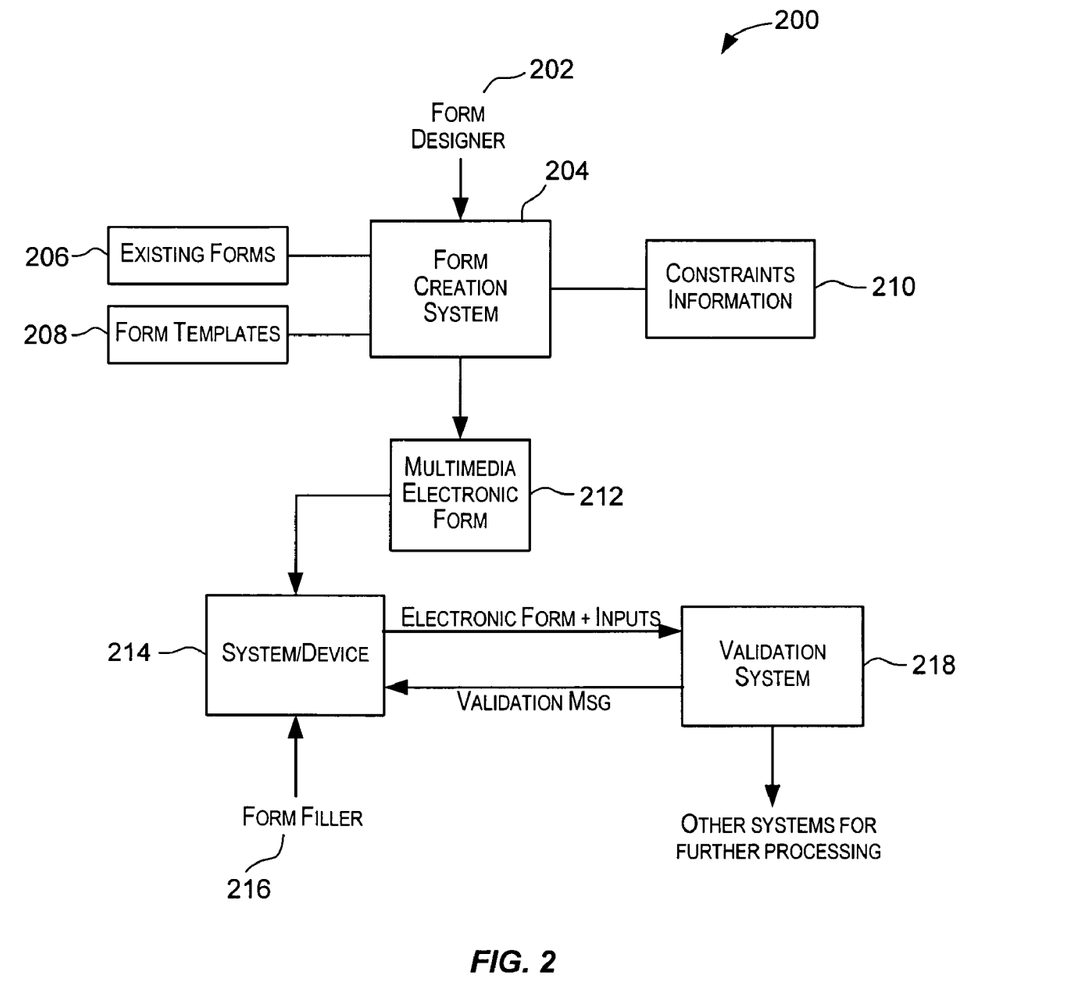
FIG. 2 is a simplified block diagram of a system for creating and validating multimedia forms according to an embodiment of the present invention.

FIG. 2 is a simplified block diagram of a system 100 for creating and validating multimedia forms according to an embodiment of the present invention. FIG. 2 is merely illustrative of an embodiment incorporating the present invention and does not limit the scope of the invention as recited in the claims. One of ordinary skill in the art would recognize other variations, modifications, and alternatives.

As depicted in FIG. 2, a form designer 202 may use a form creation system 204 to design electronic forms, including multimedia electronic multimedia forms 212. A new multimedia electronic form may be created from scratch or may be created using existing forms 206 or form templates 208. Form creation system 204 enables form designer 202 to specify the fields to be included in the multimedia electronic form and the type of information that the fields are configured to receive as input. As part of the electronic form creation process, a set of constraints may be specified for one or more fields of the form, including constraints for fields configured to accept multimedia information as input. The constraints are used for validating the form. Form creation system 204 may have access to a list of constraints 210 from which the form designer can pick and chose a set of constraints for fields of the electronic multimedia form being created. A list of available constraints may be presented to the form designer who can then select the constraints to be associated with the fields of the form.

One or more constraints may be associated with a field of the form, including a field configured to accept multimedia information as input. A constraint for a field may be related to some aspect or characteristic of the information that the field is configured to accept. If multiple constraints are specified for a field, then information identifying the manner in which the constraints are to be combined for the field may also be specified. According to an embodiment of the present invention, the manner in which constraints for a field are to be combined may be specified, for example by form designer 202. In one embodiment, Boolean operators may be specified for combining the constraints. The Boolean operators form a Boolean expression comprising the constraints. For example, if constraints C1 and C2 are specified for a field of an electronic form, the constraints may be combined as (C1 AND C2), indicating that both constraints C1 and C2 have to be satisfied in order for successful validation of the information input in the field. Other Boolean or logical operators (e.g., OR, NOT, NAND, NOR) may also be used to specify relationships between constraints for a field. The AND operator may be used as the default combination operator between constraints for a field when no specific combination is identified by the form designer and multiple constraints have been defined for the field. In this manner, a syntactic method is provided for expressing and combining constraints for a field of a multimedia electronic form. The constraints are used for validating the fields of the form.

In some embodiments, form creation system 204 may be used for associating constraints with preconfigured electronic forms. For example, an electronic form may be provided that may have been created using form creation system 204 or some other system. A form designer may then associate one or more constraints with the fields of the preconfigured electronic form using form creation system 204.

A form designer may also specify specific actions to be performed when validation succeeds or fails. The actions may be specified for the form as a whole or may be specified on a per-field basis. For example, for a particular field, the form designer may specify actions, if any, to be performed when validation for the field fails and actions, if any, to be performed when validation for the field is successful. Actions may also be specified on a per constraint basis. For example, one or more actions to be performed when a particular constraint is satisfied, or alternatively not satisfied, may be specified for a constraint.

Based upon information received from form designer 202, form creation system 204 is configured to create an electronic multimedia form 212 along with associated constraints. Multimedia electronic form 212 is then available to be used. Electronic form 212 may be output to a user wanting to use the form via system 214. System 214 may be any system or device that enables a user (form filler 216) to access or view electronic form 212 and also enables a user to input information into the fields of electronic form 212. Examples of system 214 include a desktop computer, a laptop, a PDA, a mobile communication device such as a cellular phone, a kiosk, a multi-function device, and the like. Form filler 216 may enter information into the fields of form 212 using system 214.

According to an embodiment of the present invention, after information has been entered in form 212 by form filler 216, the electronic form along with the information input by form filler 216 is communicated to a validation system 218. Validation system 218 is configured to run validation checks on the information entered by the form filler based upon constraints specified for the form. The validation may be performed on the whole electronic form, for example, when the form filler selects "Submit" button 138 shown in FIG. 1. The validation may also be performed on a per-field basis when the user enters information in a field. For example, validation for a field may be performed when the user inputs information in the field and then hits the <Enter>key. Validation for a field may also be performed when the user inputs information in the field and then moves the cursor out of the field (e.g., upon hitting the <TAB>key to go from one field to the next).

Validation system 218 may initiate one or more actions based upon the results of the validation. For example, if the information entered in a particular field fails to satisfy the constraints associated with the field, then validation system 218 may generate an error message that may be output to form filler 216 using system 214. The error message may identify the reason for the validation failure, may request the form filler to re-enter information for that field, ask the form filler to check the entered information, and the like. Messages indicating validation success may also optionally be generated by validation system 218 and output to form filler 216 using system 214. Other actions may also be performed or initiated by validation system 218 based upon the results of the validation. For example, if the form is successfully validated, then validation system 218 may mark the electronic form as validated and communicate the electronic form to other systems or applications for further processing.

Figure 3:
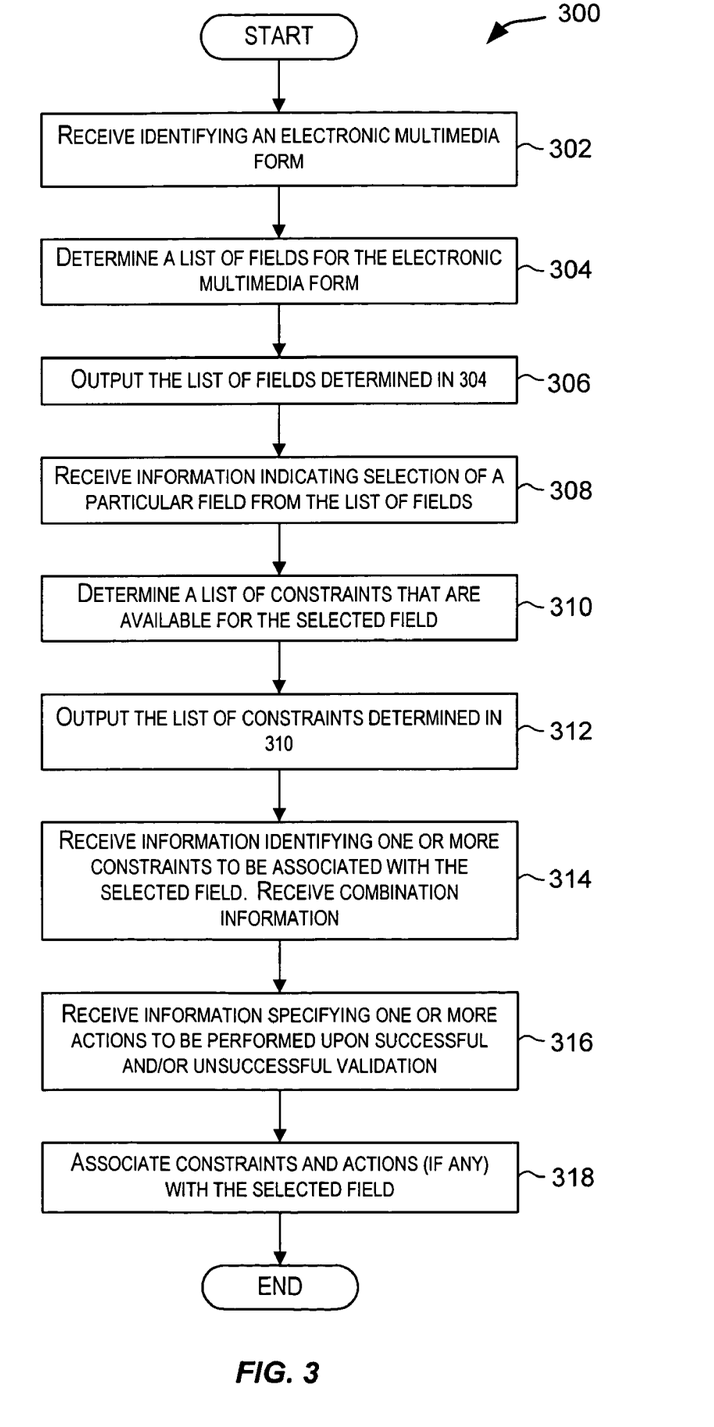
FIG. 3 is a simplified high-level flowchart depicting a method of associating constraints with fields of a multimedia electronic form according to an embodiment of the present invention.

As indicated above, form creation system 204 enables form designer to associate constraints with fields of an electronic form. FIG. 3 is a simplified high-level flowchart 300 depicting a method of associating constraints with fields of a multimedia electronic form according to an embodiment of the present invention. The method depicted in FIG. 3 may be performed by software code modules or instructions executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, information is received identifying an electronic multimedia form (step 302). A list of fields specified for the electronic multimedia form is then determined (step 304). The list of fields may include at least one field that is configured to accept multimedia information. The list of fields determined in 304 may be output, for example to the form designer (step 306). Information is received indicating selection of a particular field from the list of fields (step 308). A list of constraints that are available for the selected field are then determined (step 310). The list of constraints may be determined based upon the type of information that the selected field is configured to accept. For example, a first list of constraints may be determined if the selected field is configured to accept audio information, a second list of constraints (which may potentially be different from the first list) may be determined if the selected field is configured to accept video information, and so on. Accordingly, if the type of information that the selected field is configured to accept has been set then that information is used to determine the list of available constraints. If the type of information has not been set for the selected field, then all the available constraints (including constraints that enable a user to set the type of information for a field) may be included in the list of constraints determined in 310.

The list of constraints determined in 310 is then output to the form designer (step 312). Information is received identifying one or more constraints that the form designer wants to associate with the selected field (step 314). For example, let us assume that the selected field is field 114 of form 100 depicted in FIG. 1, and the form designer wants to ensure that image input in field 114 is of sufficiently high resolution for use in court, that the image must be sharp, and include images of certain parts of the car. The form designer might specify the following four constraints for the field:

C1: Image must have at least 5 million pixels
C2: Image aspect ratio is more than 1.5:1
C3: Image has a "blur" rating below a threshold "K"
C4: Image has a car in an appropriate orientation.

The constraints may also specify whether information must be entered in the selected field (i.e., the field is a "required" field). A constraint specified for a field configured to receive multimedia information may be dependent in the value of an entry in another field on the electronic form. The another field may be a field configured to accept multimedia information or non-multimedia information. A constraint specified for a non-multimedia information field may be dependent in the value of an entry in another field (which may be a multimedia information field or a non-multimedia information field) on the electronic form.

If multiple constraints have been specified, as defined for field 112, then information identifying the manner in which the constraints are to be combined (or relationships between the constraints) may also be received in 314. In one embodiment, Boolean operators may be used for combining the constraints. For example, if constraints C1 and C2 are specified for a field of an electronic form, the constraints may be combined as (C1 AND C2), indicating that both constraints C1 and C2 have to be satisfied in order for successful validation of the information input in the field. Other Boolean or logical operators (e.g., OR, NOT, NAND, NOR) may also be used to specify relationships between constraints for a field. The Boolean AND operator may be used as the default combination operator if no specific combination operator is specified.

As described above, form designer may also specify specific actions to be performed when validation succeeds or fails. The actions may be specified for the form as a whole or may be specified, on a per-field basis, or even for individual constraints. Accordingly, information may optionally be received specifying one or more actions to be performed when validation for the selected field fails and/or succeeds (step 316). In alternative embodiments, the actions logic may be programmed into the system or device (such as validation system 218 depicted in FIG. 1) that is configured to respond to validation success or failure. One class of actions may involve setting the value of one of the fields based on the result of a constraint evaluation. For example, a checkbox field labeled "Items Valid" might be marked when all the fields of a multimedia form have acceptable values.

The constraints (including combination information) and the actions (if any) specified by the form designer are then associated with the selected field (step 318). The constraints information and the actions information may be stored as part of the electronic form.

Figure 4:
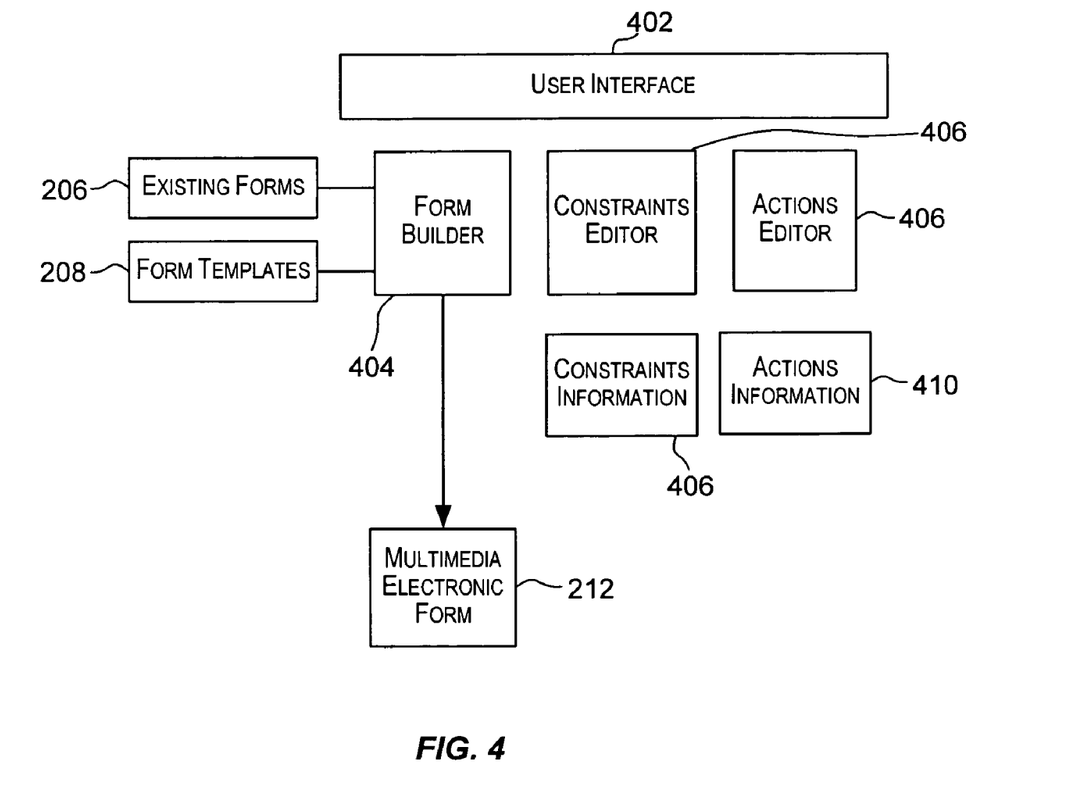
FIG. 4 is a simplified block diagram of modules that may be used to facilitate creation of multimedia electronic forms according to an embodiment of the present invention.

FIG. 4 is a simplified block diagram of modules that may be used to facilitate creation of multimedia electronic forms according to an embodiment of the present invention. The modules depicted in FIG. 4 may be implemented in software (code modules or instructions) or hardware or combinations thereof. Further, the modules depicted in FIG. 4 depict just one embodiment of the present invention and are not intended to limit the scope of the present invention as recited in the claims.

A user interface module 402 is provided for outputting information related to creation of electronic forms and for receiving input that is used for electronic forms creations. For example, user interface 402 enables a form designer to interact with the form creation system. The inputs may be provided using input devices such as a mouse, a keyboard, a pointer, etc. The inputs provided by form designer may include information identifying fields for a form, constraints to be associated with the fields, actions to be performed when validation succeeds or fails, and the like. Form builder module 404 is configured to perform processing for creating an electronic form 212. Form builder module 404 has access to form templates 208 and existing electronic forms 206 that may be used to build new forms. Form builder module 404 works in co-operation with constraints editor module 406 and actions editor module 408 for building multimedia electronic forms.

Constraints editor module 406 enables a form designer to specify constraints for fields of an electronic form and to specify combination relationships between multiple constraints for a field. The constraints are then associated with the particular field. Constraints editor module 406 has access to constraints information 406 that may identify the various constraints that are available.

Actions editor module 408 enables a form designer to specify specific actions to be performed when validation for a field is successful or not successful. The actions may be specified for the electronic form as a whole, for individual fields of an electronic form, or for individual constraints. Actions editor module 408 may have access to actions information 410 that identifies the various actions available for selection by a form designer. The form designer may also specify other customized actions.

As described above, one or more constraints may be associated with fields of an electronic form. The constraints are then used to validate the fields. The type of constraints associated with a field may depend upon the type of information that the field is configured to accept. For example, constraints associated with fields that are configured to accept multimedia information may be based upon or related to attributes or characteristics of the multimedia information. For example, for a field configured to accept an image as input, the constraints specified for the field may relate to the attributes of an image. Examples of constraints that may be specified for a field configured to accept an image may include constraints related to image attributes such as image size, image shape, image color depth (or bit depth), motion blur, blur measure or focus for the image (to infer whether an image is sufficiently focused), overall image brightness, image contrast, image resolution (e.g., a constraint related to the number of pixels in the image), image aspect ratio, image contents, whether the image is unique against an existing database, whether the image is sharply focused, whether the image comprises metadata tags or lack thereof, image resolution, image color model (e.g., CYMK, RGB, etc.), image color range, whether the image contains detectable elements (examples of detectable elements include faces, automobiles, flowers, etc.), whether the image contains steganographic data, constraints based upon identification information related to the device (e.g., a camera) used to capture the image, constraints related to a date associated with the image (e.g., the date may represent the date when the image was captured), constraints related a time associated with the image (e.g., the time may indicate when the image was captured), constraints based upon GPS locations associated with the image, image format (e.g., JPG vs. J2k), whether the image is a multi-page (i.e., "n" pages) image, and other constraints related to image attributes. For example, a field might allow entry of only images which have been created with an approved model of a camera, and the Make and Model entries of EXIF tags, as specified by the Japan Electronics and Information technology Industries Association, may be checked to validate the images). Steganographic data or information refers to information hidden within the content of an image by subtly manipulating image sample values in a known way. A standard example is to include a black and white image within a color image, by manipulating the least significant color bit of the image. By removing all color information except for the least significant bit, the black and white image can be recovered, and yet the full color image remains almost indistinguishable from the original to the unaided human eye. Steganographic techniques are often used for inclusion of copyright information as a watermark within commercial images.

Constraints may also be specified for video information. Constraints associated with a field configured to receive video information may be related to attributes or characteristics of video information. For example, one could set a constraint that every frame (or a particular frame, or a particular series of frames) of the video must meet a set of constraints specified for still images. A constraint may also be specified requiring the video information entered in a field to be of a certain temporal length, or a certain frame rate. Examples of constraints that may be specified for a field configured to accept video information as input may include constraints related to or associated with: temporal characteristics of the video information (e.g., constraints related to video length), one or more frames of the video (image constraints may be specified for the frames), video quality, sound quality of the video (discussed below with respect to constraints for audio information), video metadata tags, MPEG related structure elements present in the video (e.g., presence of MPEG-7 structure elements), closed caption information, scene detection, and other constraints related to video information attributes. Video quality constraints may relate to constraints associated with frames (expressible as one frame, every frames, a set of frames, at least "n" frames, at least one, at most "n", mean, median, mode, number of scene transitions present within the video, number of individual faces recognized over time, or other content based constraints) of the video information.

Constraints may also be specified for audio information. Constraints associated with a field configured to receive audio information may be related to attributes or characteristics of audio information. For example, one could specify constraints related to temporal and/or sampling rates associated with the audio information. Constraints for metadata information may also be specified. Examples of constraints that may be specified for a field configured to accept audio information as input may include constraints related to temporal characteristics of the audio information, sampling rate associated with the audio information, constraints associated with metadata for the audio information, tags (e.g., MP3 tags) associated with the audio information, a speaker of the audio information (speech recognition), side channel information, audio volume, characteristics of the audio signal (e.g., audio noise), variability of the audio, frequency histogram associated with the audio information, audio fingerprint, etc. Different types of constraints may also be specified for other types of information.

Figure 5:
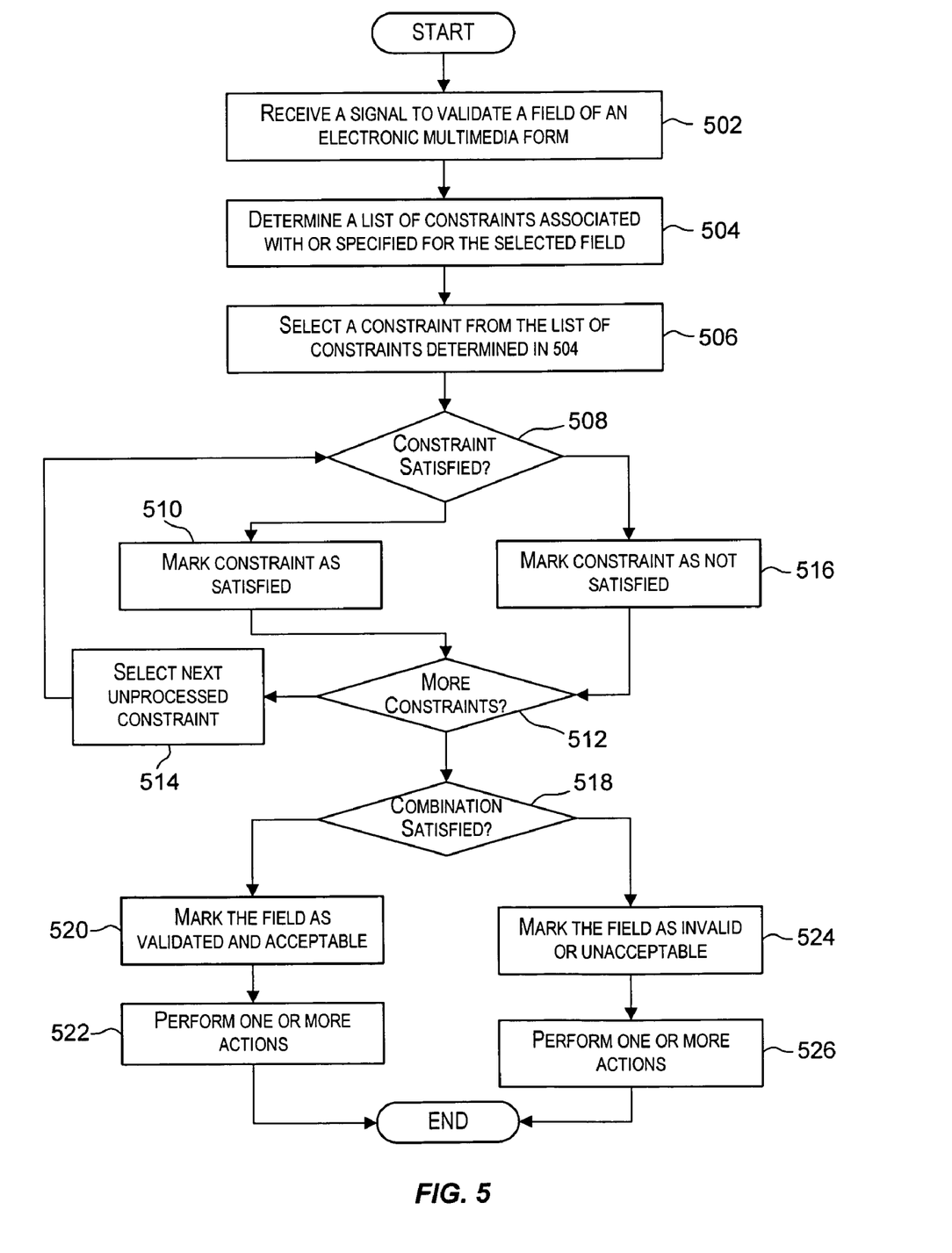
FIG. 5 is a simplified high-level flowchart depicting a method of validating a field on an electronic form according to an embodiment of the present invention.

As previously indicated, validation may be performed for the whole electronic form (e.g., when the form filler submits the electronic form) or may also be performed on a per-field basis. FIG. 5 is a simplified high-level flowchart 500 depicting a method of validating a field on an electronic form according to an embodiment of the present invention. The method depicted in FIG. 5 may be performed by software code modules or instructions executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints.

As depicted in FIG. 5, processing is initiated upon receiving a signal to validate a field of an electronic multimedia form (step 502). According to the teachings of the present invention, the field to be validated may be configured to accept multimedia information. A list of constraints associated with or specified for the field is then determined (step 504). A constraint is then selected from the list of constraints determined in 504 (step 506).

Processing is then performed to determine if the selected constraint is satisfied for the selected field (step 508). As part of 508, the information entered in the selected field is determined and processed to determine if is satisfies the constraint. For example, the information entered in the selected field may be a multimedia object (e.g., an image, a video recording, etc.) and the multimedia object is processed to determine if it satisfies the selected constraint. If it is determined in 508 that the constraint is satisfied (or met), then the constraint is marked as satisfied (step 510). A check is then made to see if there are any more unprocessed (i.e., not previously evaluated) constraints associated with the field in the list of constraints determined in 504 (step 512). If at least one unprocessed constraint exists, then the next unprocessed constraint is selected from the list of constraints determined in 504 (step 514) and processing continues with step 508. If it is determined in 508 that the constraint is not satisfied or met, then the constraint is marked as not satisfied (step 516) and processing continues with step 512.

After all the constraints associated with the field have been evaluated or processed, a determination is made if the field satisfies the combination of the constraints specified for the field (step 518). As described above, the constraints may be combined using Boolean operators to form a Boolean expression of constraints. Accordingly in 518, a result for the Boolean combination of the constraints (or Boolean expression) is evaluated and checked to see whether it evaluates to a TRUE indicating that the field and its input information passed the constraints combination or evaluates to a FALSE indicating that the field and its input information did not pass the constraints combination. For example, if the combination is specified as (C1 AND C2), then the combination evaluates to TRUE only if both constraints C1 and C2 are deemed satisfied. If the combination is specified as (C1 OR C2), then the combination evaluates to TRUE if either constraints C1 or C2 are satisfied. A default AND Boolean operator may be used for evaluating the combination if no specific operator has been specified.

If it is determined in 518 that the field and its input information passes the combination of the constraints, then the field is marked as validated and acceptable (step 520). One or more actions may optionally be performed in response to the successful validation (step 522). These actions may include for example storing the information entered in the field to a database, outputting information to the form filler, etc. Responsive actions may be configured specific to a field. Actions may even be configured specific to a constraint, i.e., the action is performed when the constraint is satisfied or alternatively not satisfied. The actions may be configured by the form designer, form processing flow controller, or some other user or process that is responsible for processing the electronic form.

If it is determined in 518 that the field and its input information does not pass or satisfy the combination of the constraints, then the field is marked as invalid or unacceptable (step 524). One or more actions may also be optionally performed in response to the unsuccessful validation of the field (step 526). These actions may include for example, outputting an error message to the form filler requesting the form filler to reenter or recheck information entered in the field, logging an error message, etc. As described above, the actions to be performed may be configured for the field or even for a constraint, i.e., the action is performed when the constraint is satisfied or alternatively not satisfied.

Information specifying combination of constraints may not be specified in some embodiments of the present invention. For example, in one embodiment of the present invention, a field may be considered successfully validated if the information entered in the field satisfies all the constraints associated with the field. A field may be considered to fail validation if the information entered in the field does not satisfy all the constraints associated with the field.

The processing depicted in FIG. 5 may be repeated for each field of an electronic multimedia. For example, when a form filler fills in information in the various fields of an electronic form and then "submits" the electronic form, a list of all fields in the electronic form may be determined and the processing depicted in FIG. 5 may be performed for each field of the electronic form, including fields configured to accept multimedia information as input. In one embodiment, the electronic form may be marked as invalid or unacceptable if any one of the fields of the electronic form is not successfully validated, else the electronic form is marked as validated or acceptable. The validation information may be stored as part of the electronic form. One or more actions may also be performed based upon the success or failure of the electronic form validation process. As previously indicated, the actions may be configured specific to a field or specific to a constraint. The actions may be configured by the form designer, form processing flow controller, or some other user or process that is responsible for processing the electronic form. Actions performed upon successful validation may include for example, submitting the electronic form along with its input data to another process or application for further processing, storing the information entered in the fields of the electronic form in a database, and the like. Actions performed upon successful validation may include for example, outputting an error message to the form filler requesting the form filler to reenter or recheck information entered in the field, logging an error message, etc.

Figure 6:
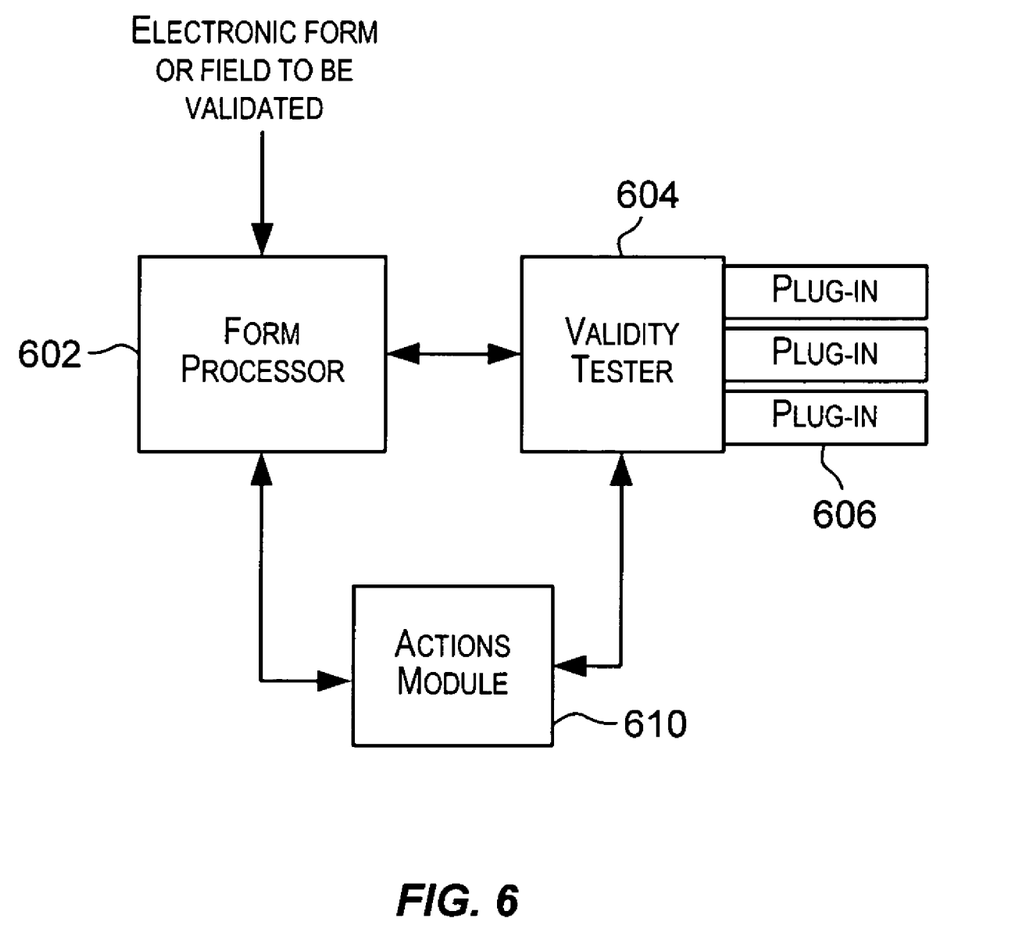
FIG. 6 is a simplified block diagram of modules that may be used to validate electronic multimedia forms according to an embodiment of the present invention.

FIG. 6 is a simplified block diagram of modules that may be used to validate electronic multimedia forms according to an embodiment of the present invention. The modules depicted in FIG. 6 may be implemented in software (code modules or instructions) or hardware or combinations thereof. Further, the modules depicted in FIG. 6 depict just one embodiment of the present invention and are not intended to limit the scope of the present invention as recited in the claims.

Form processor module 602 is configured to receive an electronic form or a field of an electronic multimedia form for validation. Form processor module 602 is configured to perform the validation processing in conjunction with validity tester module 604. For a given electronic form, form processor module 602 is configured to determine a list of fields of the electronic multimedia form and information, if any, entered in the fields. Each field is then validated by validity tester module 604.

For each field to be validated, validity tester module 604 is configured to access or determine constraints 608 specified for the field. In one embodiment, the constraints may be stored as part of the form to be validated. Validity tester module 604 may use one or more plug-in modules 606 to perform processing to determine if the field and its entered information satisfies the constraints associated with the field. Each plug-in module may be configured to perform processing to check a particular constraint. For example, a plug-in module may be configured to perform contrast and blur related checks. Plug-ins may also be configured to perform evaluate constraints specified for a particular type of information. For example, plug-ins may be provided for performing constraints processing for multimedia information. A first plug-in may be provided to check validity of audio information, a second plug-in may be provided for checking video information, and so on. The use of plug-ins enhances the flexibility of the validity processing. New types of constraint checks can be easily accommodated by providing plug-ins to run the checks. Likewise, validity checking can be performed for various types of information by providing plug-ins for performing the corresponding processing. It should however be apparent that plug-ins are not required for the present invention as recited in the claims. Other techniques may also be used to perform the validity checking.

Action module 610 is configured to perform actions. These actions may be performed responsive to success or failure of the validation processing. Actions to be performed may be specified for the electronic form being validated. Actions may also be specified for particular fields of the electronic form. Actions may also be specified for specific constraints associated with fields of an electronic form. The actions to be performed may be specified by the form designer, the form processing flow controller, or some other user or process that is responsible for processing the electronic form.

Figure 7:
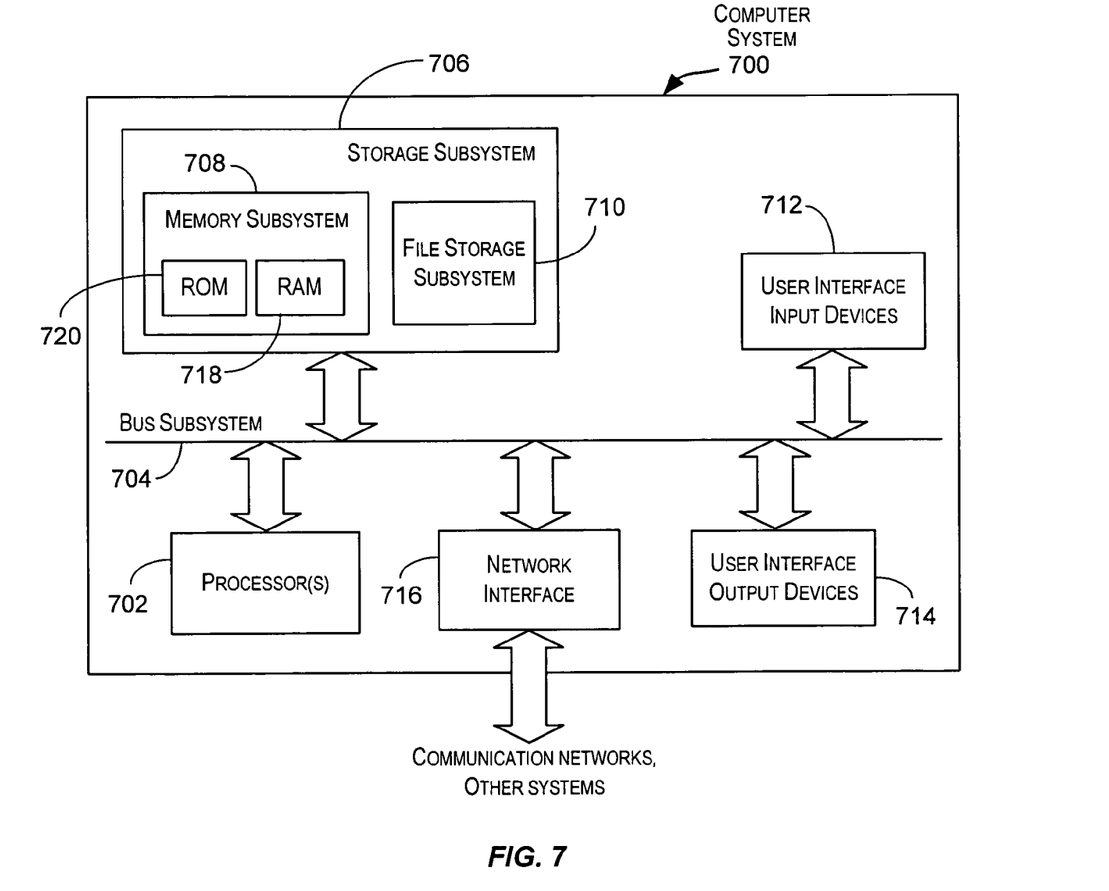
FIG. 7 is a simplified block diagram of a computer system that may be used to practice an embodiment of the present invention.

FIG. 7 is a simplified block diagram of a computer system 700 that may be used to practice an embodiment of the present invention. As shown in FIG. 7, computer system 700 includes a processor 702 that communicates with a number of peripheral devices via a bus subsystem 704. These peripheral devices may include computer readable storage medium such as storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, and networks, and devices. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Computer readable storage medium such as storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer readable storage medium storing a plurality of instructions for controlling a data processor to validate an electronic form comprising a set of one or more fields, the plurality of instructions comprising:
   instructions that cause the data processor to receive audio data as input information to be associated with a first field from the set of fields;
   instructions that cause the data processor to determine a set of constraints associated with the first field, the set of constraints based upon audio data attributes of the audio data, the audio data attributes comprising a speaker of the audio data, a signal characteristic of the audio data, variability of the audio data, a frequency histogram associated with the audio data, a fingerprint of the audio data, a temporal characteristic of the audio data, a sampling rate of the audio data, metadata associated with the audio data, a tag associated with the audio data, side channel information of the audio data, and a volume of the audio data;
   instructions that cause the data processor to analyze the input information to determine audio data attributes of the input information from the input information; and
   instructions that cause the data processor to determine, for each constraint from the set of constraints, if the audio data attributes of the input information satisfy an audio data attribute of said each constraint.

2. The computer readable storage medium of claim 1 further comprising determining if a combination of the constraints in the set of constraints determined for the first field is satisfied by the input information.

3. The computer readable storage medium of claim 2 wherein determining if the combination of the constraints in the set of constraints determined for the first field is satisfied comprises:
   determining a Boolean expression combining the one or more constraints in the set of constraints; and
   determining if the Boolean expression evaluates to true or false.

4. The computer readable storage medium of claim 2 further comprising:
   marking the first field as acceptable if the combination of the constraints in the set of constraints is satisfied by the information; and
   marking the first field as unacceptable if the combination of the constraints in the set of constraints is not satisfied by the input information.

5. The computer readable storage medium of claim 1 further comprising:
   indicating that the first field is successfully validated if the input information satisfies each constraint in the set of constraints.

6. The computer readable storage medium of claim 1 wherein the set of constraints for the first field comprises at least one constraint that is dependent on information associated with a second field from the set of fields of the electronic form.

7. A system for validating an electronic form comprising a set of one or more fields, the system comprising:
   a processor; and
   a memory, the memory storing a plurality of instructions which when executed by the processor cause the processor to:
      receive audio data as input information to be associated with a first field from the set of fields;
      determine a set of constraints associated with the first field, the set of constraints based upon audio data attributes of the audio data, the audio data attributes comprising a speaker of the audio data, a signal characteristic of the audio data, variability of the audio data, a frequency histogram associated with the audio data, a fingerprint of the audio data, a temporal characteristic of the audio data, a sampling rate of the audio data, metadata associated with the audio data, a tag associated with the audio data, side channel information of the audio data, and a volume of the audio data;
      analyze the input information to determine audio data attributes of the input information from the input information; and
      determine, for each constraint from the set of constraints, if the audio data attributes of the input information satisfy an audio data attribute of said each constraint.

8. The system of claim 7 wherein the plurality of instructions comprises instructions which when executed by the processor cause the processor to determine if a combination of the constraints in the set of constraints determined for the first field is satisfied by the input information.

9. The system of claim 8 wherein the plurality of instructions comprises instructions which when executed by the processor cause the processor to:
   mark the first field as acceptable if the combination of the constraints in the set of constraints is satisfied by the information; and
   mark the first field as unacceptable if the combination of the constraints in the set of constraints is not satisfied by the input information.

10. The system of claim 7 wherein the plurality of instructions comprises instructions which when executed by the processor cause the processor to:
   indicate that the first field is successfully validated if the input information satisfies each constraint in the set of constraints.

11. The system of claim 7 wherein the set of constraints for the first field comprises at least one constraint that is dependent on information associated with a second field from the set of fields of the electronic form.

12. A computer readable storage medium storing a plurality of instructions for controlling a data processor to validate an electronic form comprising a set of one or more fields, the plurality of instructions comprising:
   instructions that cause the data processor to receive video data as input information to be associated with a first field from the set of fields;
   instructions that cause the data processor to determine a set of constraints associated with the first field, the set of constraints based upon video data attributes of the video data, the video data attributes comprising a quality of the video data, scene detection information from the video data, a sound quality of the video data, an MPEG related structure element present in the video data, closed caption information in the video data, a scene transition in the video data, frames of the video data, a temporal attribute of the video data, frame rate of the video data, and a metadata tag associated with the video data;

instructions that cause the data processor to analyze the input information to determine video data attributes of the input information from the input information; and instructions that cause the data processor to determine, for each constraint from the set of constraints, if the video data attributes of the input information satisfy an video data attribute of said each constraint.

13. The computer readable storage medium of claim 12 further comprising determining if a combination of the constraints in the set of constraints determined for the first field is satisfied by the input information.

14. The computer readable storage medium of claim 13 wherein determining if the combination of the constraints in the set of constraints determined for the first field is satisfied comprises:

determining a Boolean expression combining the one or more constraints in the set of constraints; and determining if the Boolean expression evaluates to true or false.

15. The computer readable storage medium of claim 13 further comprising:

marking the first field as acceptable if the combination of the constraints in the set of constraints is satisfied by the information; and marking the first field as unacceptable if the combination of the constraints in the set of constraints is not satisfied by the input information.

16. The computer readable storage medium of claim 12 further comprising:

indicating that the first field is successfully validated if the input information satisfies each constraint in the set of constraints.

17. The computer readable storage medium of claim 12 wherein the set of constraints for the first field comprises at least one constraint that is dependent on information associated with a second field from the set of fields of the electronic form.

18. A system for validating an electronic form comprising a set of one or more fields, the system comprising:

a processor; and a memory, the memory storing a plurality of instructions which when executed by the processor cause the processor to:

receive video data as input information to be associated with a first field from the set of fields;

determine a set of constraints associated with the first field, the set of constraints based upon video data attributes of the video data, the video data attributes comprising a quality of the video data, scene detection information from the video data, a sound quality of the video data, an MPEG related structure element present in the video data, closed caption information in the video data, a scene transition in the video data, frames of the video data, a temporal attribute of the video data, frame rate of the video data, and a metadata tag associated with the video data;

analyze the input information to determine video data attributes of the input information from the input information; and determine, for each constraint from the set of constraints, if the video data attributes of the input information satisfy an video data attribute of said each constraint.

19. The system of claim 18 wherein the plurality of instructions comprises instructions which when executed by the processor cause the processor to determine if a combination of the constraints in the set of constraints determined for the first field is satisfied by the input information.

20. The system of claim 19 wherein the plurality of instructions comprises instructions which when executed by the processor cause the processor to:

mark the first field as acceptable if the combination of the constraints in the set of constraints is satisfied by the information; and mark the first field as unacceptable if the combination of the constraints in the set of constraints is not satisfied by the input information.

21. The system of claim 18 wherein the plurality of instructions comprises instructions which when executed by the processor cause the processor to:

indicate that the first field is successfully validated if the input information satisfies each constraint in the set of constraints.

22. The system of claim 18 wherein the set of constraints for the first field comprises at least one constraint that is dependent on information associated with a second field from the set of fields of the electronic form.

23. A computer readable storage medium storing a plurality of instructions for controlling a data processor to validate an electronic form comprising a set of one or more fields, the plurality of instructions comprising:

instructions that cause the data processor to receive image data as input information to be associated with a first field from the set of fields;

instructions that cause the data processor to determine a set of constraints associated with the first field, the set of constraints based upon image data attributes of the image data, the image data attributes comprising a blur measure of the image data, motion blur in the image data, uniqueness of the image data in a database, color range of the image data, a detectable element in the image data, steganographic data in the image data, a shape of the image data, color depth of the image data, brightness of the image data, a contrast of the image data, resolution of the image data, an aspect ratio of the image data, focus of the image data, a metadata tag in the image data, a device used to capture the image data, a date associated with the image, a time associated with the image data, a GPS location associated with the image data, and a multi-page characteristic of the image data;

instructions that cause the data processor to analyze the input information to determine image data attributes of the input information from the input information; and instructions that cause the data processor to determine, for each constraint from the set of constraints, if the image data attributes of the input information satisfy an image data attribute of said each constraint.

24. The computer readable storage medium of claim 23 further comprising determining if a combination of the constraints in the set of constraints determined for the first field is satisfied by the input information.

25. The computer readable storage medium of claim 24 wherein determining if the combination of the constraints in the set of constraints determined for the first field is satisfied comprises:

determining a Boolean expression combining the one or more constraints in the set of constraints; and determining if the Boolean expression evaluates to true or false.

26. The computer readable storage medium of claim 24 further comprising:

marking the first field as acceptable if the combination of the constraints in the set of constraints is satisfied by the information; and marking the first field as unacceptable if the combination of the constraints in the set of constraints is not satisfied by the input information.

27. The computer readable storage medium of claim 23 further comprising:

indicating that the first field is successfully validated if the input information satisfies each constraint in the set of constraints.

28. The computer readable storage medium of claim 23 wherein the set of constraints for the first field comprises at least one constraints that is dependent on information associated with a second field from the set of fields of the electronic form.

29. A system for validating an electronic form comprising a set of one or more fields, the system comprising:

a processor; and a memory, the memory storing a plurality of instructions which when executed by the processor cause the processor to:

receive image data as input information to be associated with a first field from the set of fields;

determine a set of constraints associated with the first field, the set of constraints based upon image data attributes of the image data, the image data attributes comprising a blur measure of the image data, motion blur in the image data, uniqueness of the image data in a database, color range of the image data, a detectable element in the image data, steganographic data in the image data, a shape of the image data, color depth of the image data, brightness of the image data, a contrast of the image data, resolution of the image data, an aspect ratio of the image data, focus of the image data, a metadata tag in the image data, a device used to capture the image data, a date associated with the image, a time associated with the image data, a GPS location associated with the image data, and a multi-page characteristic of the image data;

analyze the input information to determine image data attributes of the input information from the input information; and determine, for each constraint from the set of constraints, if the image data attributes of the input information satisfy an image data attribute of said each constraint.

30. The system of claim 29 wherein the plurality of instructions comprises instructions which when executed by the processor cause the processor to determine if a combination of the constraints in the set of constraints determined for the first field is satisfied by the input information.

31. The system of claim 30 wherein the plurality of instructions comprises instructions which when executed by the processor cause the processor to:

mark the first field as acceptable if the combination of the constraints in the set of constraints is satisfied by the information; and mark the first field as unacceptable if the combination of the constraints in the set of constraints is not satisfied by the input information.

32. The system of claim 29 wherein the plurality of instructions comprises instructions which when executed by the processor cause the processor to:

indicate that the first field is successfully validated if the input information satisfies each constraint in the set of constraints.

33. The system of claim 29 wherein the set of constraints for the first field comprises at least one constraint that is dependent on information associated with a second field from the set of fields of the electronic form.

* * * * *